Sept. 26, 1944.  M. O. TROY  2,359,173
ELECTROMAGNETIC INDUCTION APPARATUS
Filed Dec. 18, 1940 2 Sheets-Sheet 1
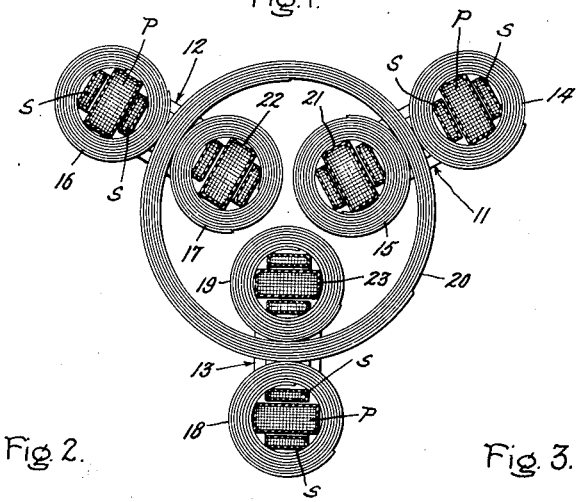
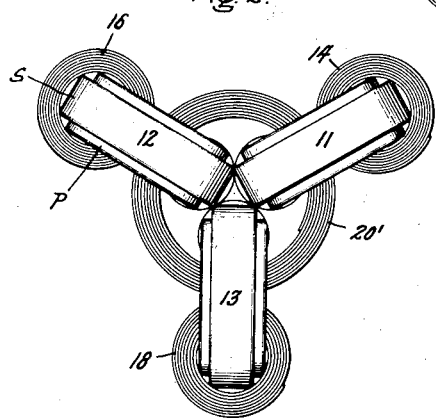
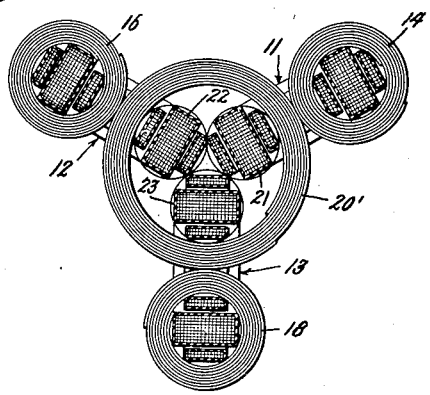
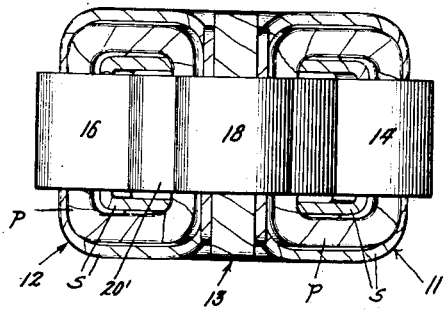
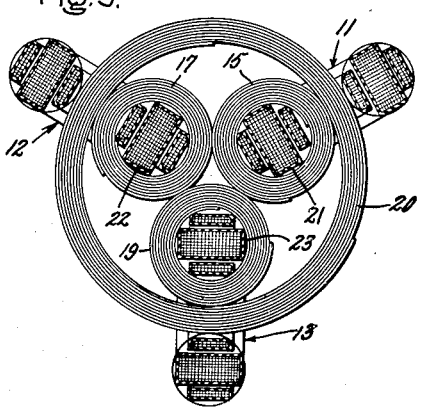
Inventor:
Matthew O. Troy,
by Harry E. Dunham
His Attorney.

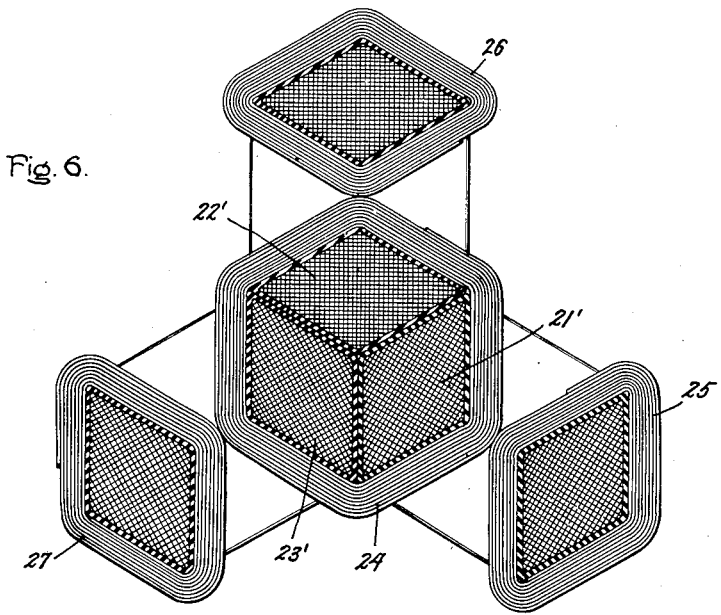
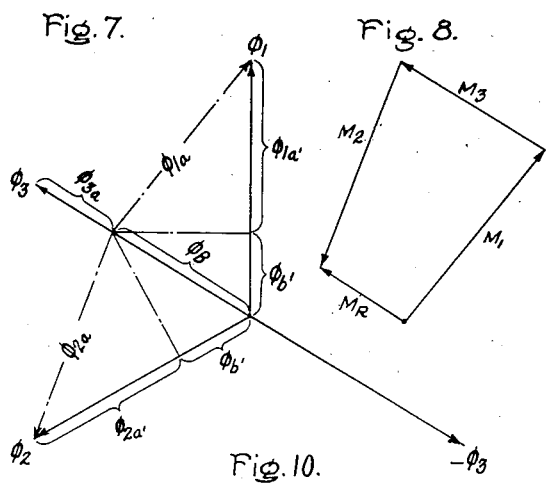
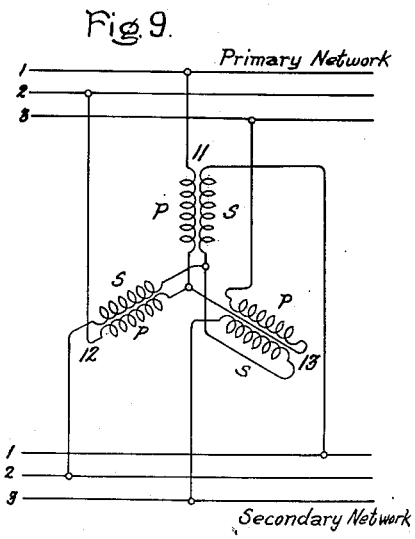
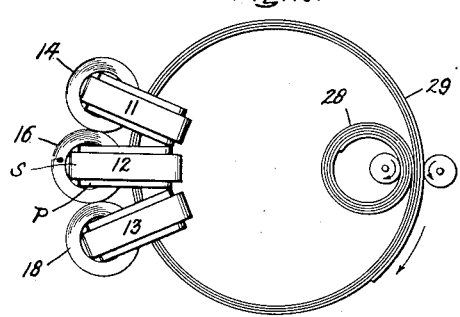

Patented Sept. 26, 1944

2,359,173

UNITED STATES PATENT OFFICE 2,359,173

ELECTROMAGNETIC INDUCTION APPARATUS

Matthew O. Troy, Schenectady, N. Y., assignor to General Electric Company, a corporation of New York Application December 18, 1940, Serial No. 370,689

8 Claims. (Cl. 175—356)

My invention relates to electromagnetic induction apparatus and concerns particularly the construction of such apparatus employing wound strip magnetic cores.

It is an object of my invention to provide polyphase electromagnetic induction apparatus, especially polyphase transformers having a unitary construction, so arranged that at least a portion of the core material serves more than one of the phases for carrying flux.

At the same time, it is an object of my invention to obtain in polyphase apparatus the advantages of the spirally wound strip construction of the magnetic core set forth in United States Patent 2,160,588—Granfield and the copending application of Jacob J. Vienneau, Serial No. 318,868, filed February 14, 1940, and which issued as Patent 2,305,649 on December 22, 1942. Other and further objects and advantages will become apparent as the description proceeds.

In carrying out my invention in its preferred form I provide a plurality of electrically conducting winding structures, according to the number of phases of the polyphase system and a plurality of wound strip magnetic cores interlinking the electrical winding structures. One of the cores links all of the electrical winding structures, whereas the remaining cores each link only one of the winding structures. In most cases, the arrangement is preferably such that the core linking all of the winding structures has the minimum feasible peripheral length.

A more complete exposition of the invention is provided by the following detailed description considered in connection with the accompanying drawings and those features of the invention which are believed to be novel and patentable will be pointed out in the claims appended hereto. In the drawings Fig. 1 is a view of one embodiment of my invention with the electrical winding structures shown in cross section. Fig. 2 is a plan view of another embodiment of my invention. Fig. 3 is a view of the arrangement of Fig. 2 with the winding structures shown in cross section, and Fig. 4 is an elevation of the arrangement represented in Figs. 2 and 3. Fig. 5 is a view of another arrangement with the winding structures shown in cross section. Fig. 6 is a similar view of still another arrangement. Fig. 7 is a vector diagram representing the fluxes acting in the various cores for the assumed condition of operation. Fig. 8 is another vector diagram representing the magnetomotive forces acting on the various cores for the condition assumed in connection with Fig. 7. Fig. 9 is a connection diagram, and Fig. 10 is a diagram illustrating a step in the operation of assembling the core with the winding structures. Throughout the drawings like reference characters are utilized to designate like parts.

In the description and drawings my invention is explained as applied to three phase transformers, by way of example, as these are the most common instances of polyphase stationary induction apparatus. It will be understood, however, that my invention is not limited to three phase apparatus nor to transformers, and that it includes other stationary induction apparatus, such as reactors. The embodiment represented by Fig. 1 of the drawings comprises three electrically conducting winding structures 11, 12 and 13, one for each of three phases, and a plurality of hollow cylindrical cores. The cores consist of a pair of cores 14 and 15, each linking one of the winding legs of the winding structure 11, a similar pair of cores 16 and 17 for the conductive winding structure 12, a third pair of similar cores 18 and 19 for the conductive winding structure 13, and a larger core 20 linking all three of the conductive winding structures 11, 12 and 13. In the case of transformers the winding structures include primary and secondary windings such as P and S, e. g., with one set of windings, e. g., the secondary windings in two parts, if desired.

The magnetic cores are in the form of hollow cylinders formed by spirally winding magnetic strip material compactly with each turn closely embracing the underlying turn. Such cores are described more in detail in the aforesaid Granfield Patent 2,160,588. The pairs of cores 14–19, inclusive, also embrace closely the winding legs of the conductive winding structures, as described in the Granfield patent, and the winding structures may consist of preformed form-wound, fully insulated structures to which the wound strip core is subsequently applied, a explained in the Granfield patent. For reasons which will be explained hereinafter, the electrical connections of the windings of one of the winding structures are preferably reversed with respect to the electrical connections of the windings of the other winding structures when the connection is made to a polyphase electrical system in which the transformer is to be used.

In assembling my polyphase stationary induction apparatus the individual cores are first applied to the winding legs of the separate winding structures 11, 12 and 13. This involves heat treating coils of magnetic strip, having the size and shape which the finished cores are to have, and then transferring the strip material from the heat treated coils to the winding legs by unwinding the strip from the coil, forming it into a larger loop, linking the winding leg and rewinding the strip from the original coil to the larger loop until all of the strip has been transferred to the larger loop, whereupon the larger loop is collapsed on the winding leg. The foregoing specific process is not my invention and is described in detail in the aforesaid Granfield patent.

After the individual cores 14–19, inclusive, or the cores 15, 17 and 19 have been applied to their respective winding legs, the larger core 20 is interlinked with all three of the winding structures. It will be understood that the number of turns of strip in the individual cores must be so chosen as to leave sufficient space for winding the turns of strip forming the larger core 20 through the three conductive winding windows of the structures 11, 12 and 13. The core 20 may be applied in a manner similar to that in which the individual cores were applied to their winding legs. However, in case the core material employed should be of such a sensitive nature as to make it difficult to form the requisite larger loop for rewinding from a heat treated coil into the windows of the three winding structures, it may be more convenient to support the three winding structures slidably on tracks radiating from the center at angles of 120 degrees, and initially far enough from the center to permit winding the larger loop of strip into the winding windows without distortion. The winding structures are then allowed to slide toward the center when the larger loop is collapsed to form the core 20. This method of assembly is not my invention, but involves the same principle as that described in the copending application of Paul A. Vance, Serial No. 306,916, filed November 30, 1939, which issued as Patent 2,249,506 on July 15, 1941, and assigned to the same assignee as the present application.

I now consider it most convenient to assemble a larger core 20 or 20' with the winding structures 11, 12 and 13 by swinging the three winding structures with the smaller cores already wound thereon into the position shown in Fig. 10. Then I unwind the strip material from the outside of a heat-treated strain-free coil of strip 28 into the larger loop 29 passing through the winding windows in the three winding structures 11, 12, and 13. The core 28 and the larger loop 29 are rotated until all the strip material has been transferred to the larger loop, whereupon the larger loop is allowed to collapse while the winding structures 11 and 13 are rotated to their normal position 120° from the winding structure 12. The larger loop 29 when thus collapsed forms a core such as the larger core 20 or 20' of Figs. 1 to 5.

The arrangement represented by Figs. 2, 3 and 4 is the electrical equivalent of that represented by Fig. 1. In each case there are individual cores for respective winding structures and a common core 20 interlinking all three of them. However, in the latter arrangement the respective field structures each have only a single individual core instead of a pair of cores, and the single cores 14, 16 and 18 are placed on the outer winding legs of the winding structures, allowing the inner winding legs 21, 22 and 23 to be brought close together to permit the utilization of an interlinking core 20' of shorter peripheral length, thus reducing the weight of iron, or other magnetic core material required and likewise reducing the iron losses.

Ordinarily on polyphase systems every effort is made to maintain equality of magnitude and phase symmetry of the line-to-line voltages. In the case of three phase apparatus this would mean three numerically equal voltages with a phase separation of 120 degrees between them, thus making the voltage vectors symmetrical about a point. Assuming equal reactances and reactive drops in each phase, phase symmetry of the voltages applied to the conductive winding would require similar phase symmetry of the induced voltages, which would, in turn, require phase symmetry of the magnetic fluxes acting in the respective conductive winding structures. However, the vector sum of three such fluxes would be zero. Therefore, with the electrical windings each connected in the same manner to the phases of the electrical system, the resultant of a flux threading or linking all three of the winding structures would equal zero, and the interlinking core 20 or 20' would carry no flux. In order that the flux may be divided between the individual cores and the interlinking core, the electrical connections of the windings of one of the winding structures are reversed. For example, let it be assumed that the electrical connections of the third winding structure 13 are reversed as shown in Fig. 9 and that the magnetic fluxes linking the winding structures 11, 12 and 13 of Figs. 2, 3 and 5 are represented by the vectors $\phi_1$, $\phi_2$ and $\phi_3$, shown in Fig. 7. Owing to the reversal of the connection of the third winding, flux $\phi_3$ extends in the opposite direction from the position of radial symmetry which it would otherwise take, namely, $-\phi_3$. Each of the three fluxes is made up of two components, since a portion of the flux which induces voltage in the windings of the winding structure flows in the individual core and a portion thereof flows in the interlinking core. In the vector diagram of Fig. 7, the following symbols are employed:

$\phi_{1a}$—flux in the core 14
$\phi_{2a}$—flux in the core 16
$\phi_{3a}$—flux in the core 18
$\phi_B$—flux in the interlinking core 20'
$\phi_{1a'}$—projection of $\phi_{1a}$ on $\phi_1$
$\phi_{2a'}$—projection of $\phi_{2a}$ on $\phi_2$
$\phi_{b'}$—projections of $\phi_B$ on $\phi_1$ and $\phi_2$ The flux $\phi_1$ acting in the winding structure 11 is the vector sum of the two fluxes $\phi_{1a}$ acting in the core 14 and $\phi_B$ acting in the interlinking core 20'. Similarly the flux $\phi_2$ is the vector sum of the two fluxes acting in the individual core and the interlinking core. The flux $\phi_3$ is also the vector sum of the flux $\phi_{3a}$ and the flux $\phi_B$. However, owing to the symmetry of the arrangement, the fluxes $\phi_B$ and $\phi_{3a}$ will probably be along the same line. It is to be observed that the reversal of the windings of the structure 18 destroys the radial symmetry about the center point of the vector diagram, Fig. 7, and the vector diagram tends to become symmetrical with respect to a line along the direction of $\phi_3$.

The magnitudes and phase relationships of the fluxes $\phi_1$, $\phi_2$ and $\phi_3$ are fixed by the voltages of the windings, which are determined by the system voltages. The fluxes in the respective cores must, therefore, be such as to give the proper resultant fluxes. However, the division of flux between cores depends upon the magnetomotive forces acting in the respective magnetic circuits and the reluctances of the several magnetic circuits. For convenience in manufacture, the cores 14, 16 and 18 will ordinarily be made of the same size and therefore have equal reluctances. The division of flux between the individual cores and the interlinking core 20', and particularly, between the individual core 18 and the interlinking core 20' will depend upon the relative reluctances of the individual cores and the interlinking core 20'. In the vector diagram the relative values of $\phi_B$ and $\phi_{3a}$ will, therefore, depend upon the peripheral length and number of turns of strip in the core 20'. Owing to the reversal of connection of the windings of structure 13, the flux $\phi_{3a}$ in the core 18 will tend to be smaller than other fluxes in the individual cores, causing the efficiency of utilization of the core 18 to be somewhat less than that of the cores 16 and 14.

It will be evident that the magnetomotive force acting in the interlinking core 20' is the resultant of the three magnetomotive forces produced by the magnetizing currents of the three winding structures 11, 12 and 13, represented in Fig. 8 by the vectors $M_1$, $M_2$, and $M_3$, respectively, and the resultant being represented by the vector $M_R$. The directions of the vectors $M_1$, $M_2$, $M_3$ and $M_R$ correspond to the directions of the vectors $\phi_{1a}$, $\phi_{2a}$, $\phi_{3a}$ and $\phi_B$, respectively, since the latter are fluxes produced by the respective magnetomotive forces. The number of turns of strip in the interlinking core 20' will be so chosen as to effect an efficient division of flux between the vectors $\phi_{3a}$ and $\phi_B$, that is, between the cores 18 and 20'. If the reluctance of the core 20' is made very great, the vector $\phi_B$ will tend to diminish to zero, forcing all three individual cores 14, 16 and 18 to carry very nearly the same flux as in three separate single-phase transformers, connected together in the three-phase system, so that no advantage thereover would be obtained. On the other hand, making the core 20' of an excessive number of turns of strip would result in poor economy of core material in the core 20'. This would also reduce to an excessively small value the flux carried in the core 18, diminishing the economy of utilization of the core material in core 18 as well.

Although the transformers or electromagnetic induction apparatus which I have disclosed are polyphase devices, they employ single phase cores. In a polyphase core the fluxes in different portions of the core are not alike either in magnitude or phase, whereas in my construction each of the cores 14 to 19, inclusive, and 20 or 20' is a single phase core which has substantially the same flux in the same phase throughout the core member.

Although I have shown various modifications of the core arrangement utilizing circular cores, that is, cores in the form of hollow, right, circular cylinders, it will be understood that my invention is not limited thereto. For example, the weight, losses and reluctance of the interlinking core 20' would be reduced and the space factor of the conductive winding material within the core window of the interlinking core 20' would be increased by causing the shape of the cross sections of the winding legs to conform more closely to the shape of the window or opening in the interlinking core 20'. In the arrangement of Fig. 6 the interlinking core 20' is replaced by a non-circular, substantially flat-sided, approximately hexagonal, core 24. The shapes of the cross sections of the winding legs 21', 22', and 23' may be such as to fit together and still form a figure which has a relatively high area in relation to perimeter. The three winding leg cross sections are made in the form of rhombuses having angles of 60 and 120 degrees alternately, in order to form a combined figure which is substantially a hexagon fitting the winding window in the interlinking core 24. For convenience in manufacture, the outer winding legs would ordinarily have the same shape as the inner winding legs, making it advisable to utilize individual cores 25, 26 and 27 of substantially rhombic shape. It will be understood that the wound strip cores 24 to 27, inclusive, being non-circular, cannot be applied by the precise method described in the aforesaid Granfield patent. The precise method of applying the strip to assemble the apparatus does not constitute a part of my invention. However, the method of applying non-circular wound-strip cores described in the copending application of Jacob J. Vienneau, Serial No. 318,868, filed February 14, 1940, may satisfactorily be employed.

With respect to the shape of the cross section of the leg of the conductive winding structure, it will be understood that my invention is not limited to the arrangements shown in Fig. 6, but obviously includes any form of radially disposed winding structure in which the cross sectional shapes are made such as to fit together and produce high space factor of the electrical winding material in the central or interlinking core. This feature is not limited to polyphase stationary induction apparatus and will obviously be advantageous even if the electrical windings are so connected as to form a single phase apparatus instead of a polyphase apparatus. In single phase apparatus the outer cores 26, 27 and 28 may be omitted.

My invention obviously is not limited to having individual rhombic cores 25, 26 and 27 on the outer legs instead of the inner winding legs 21', 22' and 23'. In cases where obtaining a minimum peripheral length of the interlinking wound strip core is not a primary consideration, the interlinking core may be wound around the winding legs on which individual cores are also wound. This arrangement for circular wound cores is represented by Fig. 5, in which the winding structures have three individual cores 15, 17 and 19, and there is an interlinking core 20 wound through all three of the winding windows.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A three-phase transformer comprising in combination, three conductive-winding structures, each consisting of primary and secondary windings, three wound-strip magnetic cores each linking one of the winding structures, and a wound-strip magnetic core linking all three of the winding structures.

2. A polyphase electromagnetic induction apparatus comprising a plurality of winding structures according to the number of phases, a plurality of wound-strip magnetic cores each linking one of said winding structures, and a single-phase wound-strip magnetic core linking all of said winding structures.

3. A three phase electromagnetic induction apparatus comprising in combination, three conductive winding structures, three wound-strip magnetic cores each linking one of the winding structures, and a wound-strip magnetic core linking all three of the winding structures, one of said winding structures having its electrical connections reversed with respect to the other two winding structures.

4. Polyphase electromagnetic induction apparatus comprising a plurality of winding structures according to the number of phases, a plurality of wound-strip magnetic cores including a single-phase core linking more than two of the winding structures, and single-phase cores linking less than all of the winding structures, each winding structure being linked by more than one single-phase core, at least one of said winding structures having its electrical connections reversed with respect to the connections of the other winding structures.

5. A polyphase transformer comprising a plurality of winding structures and magnetic core means interlinking said winding structures, said magnetic core means including for each winding structure, single-phase core means linking the winding structure with at least one of the other winding structures and additional single-phase core means not linking said one of the other winding structures, whereby phase difference between fluxes in two different core means linking a given winding structure is permitted in order to allow the requisite difference in phase of the resultant magnetic fluxes in different winding structures to correspond to the phases of the electrical system to which said winding structures are to be connected.

6. Electromagnetic induction apparatus adapted for connection to a polyphase alternating current electrical system, said apparatus comprising a plurality of winding structures and magnetic core means interlinking said winding structures, said magnetic core means being divided into a plurality of parts with closed single-phase magnetic circuits, each of said winding structures linking some part of said core means, at least one part linking more than one of said winding structures and at least one of said winding structures linking more than one of said core parts, whereby phase difference between fluxes in two different core parts linking a given winding structure is permitted in order to allow the requisite difference in phase of the resultant magnetic fluxes in different winding structures to correspond to the phases of the electrical system to which said winding structures are to be connected.

7. The method of assembling a wound strip magnetic core with a plurality of radially extending electrically conductive winding structures to form an electromagnetic induction apparatus, which comprises placing the winding structures close together with their sides adjacent each other so that the winding windows are in substantial alignment, unwinding magnetic strip material from a coil of strain-free material and simultaneously rewinding it into a larger loop passing through the windows of the conductive winding structures, progressively rotating the original coil of strip and the larger loop until all the material has been transferred to the larger loop, swinging the conductive winding structures around said larger loop until the conductive-winding structures are equi-angularly spaced around said loop, and thereupon allowing said larger loop to collapse to its original size and shape and strain-free condition and said winding structures to approach each other radially.

8. Electromagnetic induction apparatus for polyphase circuits having more than two phases, said apparatus comprising a plurality of winding structures exceeding two in number according to the number of phases, a plurality of magnetic cores each linking one of said winding structures and a single phase magnetic core linking all of said winding structures.

MATTHEW O. TROY.